(12) United States Patent
Pan et al.

(10) Patent No.: US 11,280,954 B2
(45) Date of Patent: Mar. 22, 2022

(54) DISPLAY DEVICE

(71) Applicant: InnoLux Corporation, Miao-Li County (TW)

(72) Inventors: I-Kai Pan, Miao-Li County (TW); Wei-Tsung Hsu, Miao-Li County (TW); Chun-Fang Chen, Miao-Li County (TW); Su-Chen Yen, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 16/687,612

(22) Filed: Nov. 18, 2019

(65) Prior Publication Data
US 2020/0192018 A1   Jun. 18, 2020

(30) Foreign Application Priority Data
Dec. 18, 2018 (CN) .......................... 201811554494.2

(51) Int. Cl.
*F21V 8/00* (2006.01)
*G02F 1/1335* (2006.01)

(52) U.S. Cl.
CPC ......... *G02B 6/0053* (2013.01); *G02B 6/0051* (2013.01); *G02B 6/0055* (2013.01); *G02F 1/133528* (2013.01)

(58) Field of Classification Search
CPC .. G02B 6/0053; G02B 6/0051; G02B 6/0055; G02B 2006/12195; G02B 27/30; G02F 1/133528; G02F 1/133606
USPC .......................................................... 362/607
See application file for complete search history.

(56) References Cited

U.S. PATENT DOCUMENTS

| | | | |
|---|---|---|---|
| 6,473,220 B1 * | 10/2002 | Clikeman | G02B 5/20 359/245 |
| 2010/0014313 A1 * | 1/2010 | Tillin | G02B 27/0101 362/606 |
| 2015/0062491 A1 * | 3/2015 | Sakuragi | G02B 5/3083 349/64 |
| 2015/0138833 A1 * | 5/2015 | He | G02B 6/0038 362/611 |
| 2018/0210243 A1 * | 7/2018 | Fang | G02F 1/1334 |
| 2020/0166767 A1 * | 5/2020 | Qin | G02B 6/0088 |

* cited by examiner

*Primary Examiner* — Andrew J Coughlin
*Assistant Examiner* — Jessica M Apenteng
(74) *Attorney, Agent, or Firm* — Winston Hsu

(57) ABSTRACT

A display device includes a viewing angle control panel and a backlight module. The backlight module is arranged below the viewing angle control panel, and includes a light source and an optical adjustment layer. The optical adjustment layer includes a first surface, a second surface and a plurality of openings. The second surface is arranged in opposite to the first surface and in proximity to the light source. The plurality of openings pass through the optical adjustment layer.

13 Claims, 5 Drawing Sheets

DISPLAY DEVICE

CROSS REFERENCE TO RELATED APPLICATION

This non-provisional application claims priority of China patent application No. 201811554494.2, filed on 18 Dec. 2018, included herein by reference in its entirety.

BACKGROUND OF THE DISCLOSURE

1. Field of the Disclosure

The disclosure relates to a display device, and specifically, to a display device having an adjustable viewing angle.

2. Description of the Prior Art

A display device is equipped with an anti-prying function to only allow viewers directly in front of a screen of the anti-prying display device to view the screen clearly, and viewers viewing from the two sides exceeding an angle will have difficulty in clearly viewing the information displayed on the display screen. The technology may be adopted in an automatic teller machine to decrease the probability of a pin being spied on, in customs to decrease the probability of privacy data being peeked, or in notebooks to decrease the probability of confidential information being seen.

However, further enhancements of the anti-prying function of the display device in the related art are in need.

SUMMARY OF THE DISCLOSURE

According to one embodiment of the disclosure, a display device includes a viewing angle control panel and a backlight module. The backlight module is arranged below the viewing angle control panel, and includes a light source and an optical adjustment layer. The optical adjustment layer includes a first surface, a second surface and a plurality of openings. The second surface is arranged in opposite to the first surface and in proximity to the light source. The plurality of openings pass through the optical adjustment layer.

These and other objectives of the present disclosure will no doubt become obvious to those of ordinary skill in the art after reading the following detailed description of the embodiment that is illustrated in the various figures and drawings.

DETAILED DESCRIPTION

A first material layer referred to as being disposed on or above a second material layer includes the first material layer being in a direct contact with the second material layer. Alternatively, the first material layer and the second material layer may be separated by one or more other material layers. In such a case, the first material layer and the second material layer are not in a direct contact.

As used herein, the terms "approximately" and "substantially" are referred to as being within 20% of a predetermined value or a predetermined range, and preferably, within 10%, and more preferably, within 5%, 3%, 2%, 1% or 0.5%. All quantities as provided in the disclosure are approximated quantities, i.e., "approximately" or "substantially" are implicitly implied in all embodiments without specifically mentioning approximately or substantially.

Figure 1A:
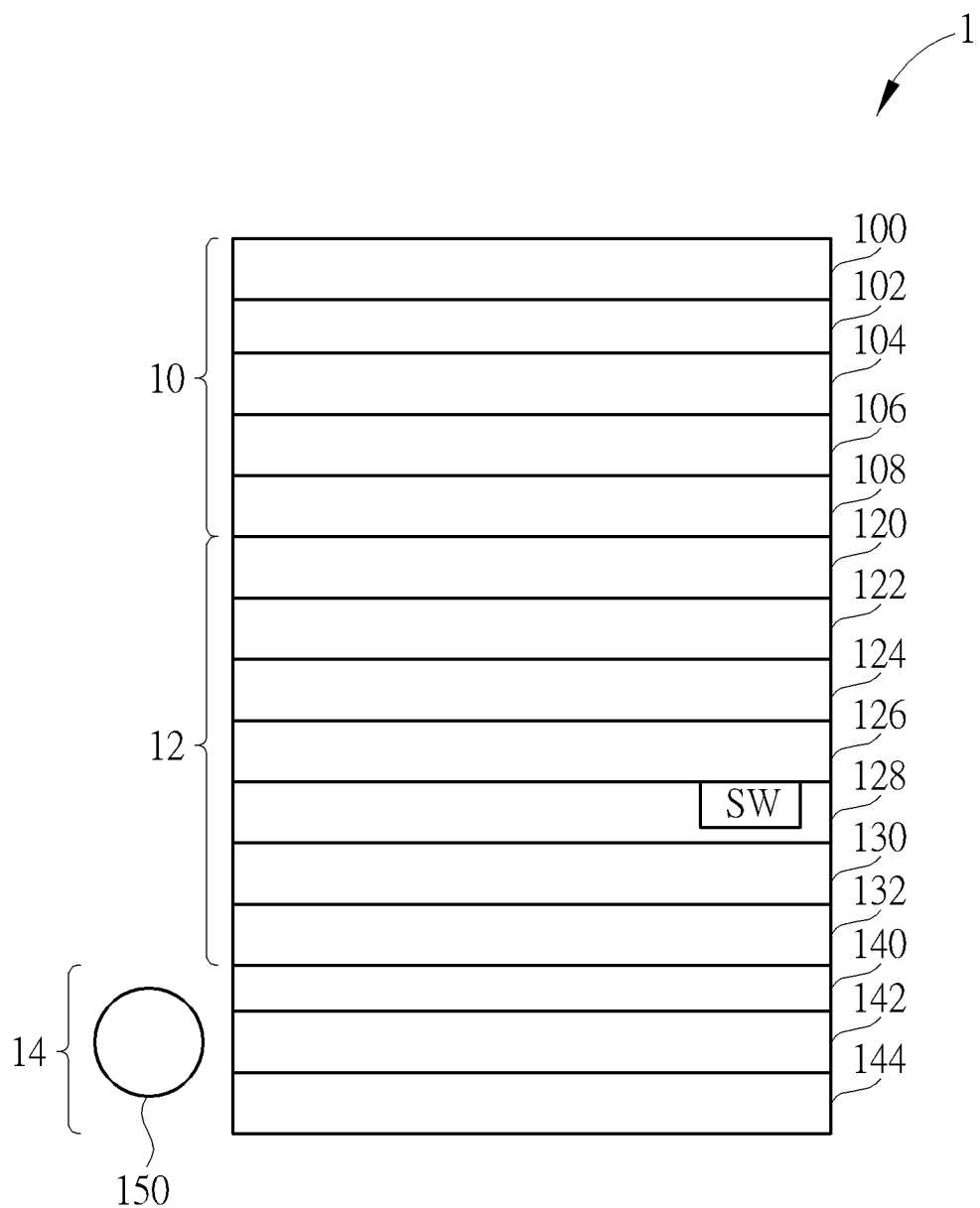
FIG. 1A is a lateral view of a display device according to an embodiment of the disclosure.

FIG. 1A is a lateral view of a display device 1 according to an embodiment of the disclosure. The display device 1 comprises a panel 10, a viewing angle control panel 12 and a backlight module 14. In some embodiments, the display device 1 may be, but is not limited to, for example, a flexible display, a touch display, a curved display or a foldable display. In the disclosure, an anti-prying capability may be defined as a ratio of luminance at 45° to luminance at 0° (e.g., the direct viewing angle). Typically, a lower ratio represents, and is not limited to, an enhanced anti-prying capability of the display device. Luminance and picture qualities have been employed to define performance of various embodiments in the disclosure. In certain embodiments, the luminance may be, but is not limited to, relative brightness of specific locations (e.g., measurements taken from 5 locations) or areas in a display screen in relation to a white screen (e.g., grayscale value 255). The picture quality may represent quality of a picture and may be measured by patterns, white spots and mura.

The display device 1 may be operated in a privacy mode or a sharing mode. In the privacy mode, a screen is only visible (e.g., having higher screen brightness) to viewers viewing directly in front of the display device 1, and less visible (e.g., a darker screen or a screen blocked by a pattern) to viewers viewing from an angle from the display device 1 (e.g., viewing from a viewing angle greater than 45 degrees). In the sharing mode, a screen is visible to viewers directly in front of or from an angle to the display device 1.

In the disclosure, certain components in the drawings are omitted for brevity. Certain components in the drawings may be omitted in other embodiments of the disclosure. Further, although only 1 layer is illustrated in the drawings, the layer may comprise, but is not limited to, a plurality of sub-layers. According to certain embodiments, the panel 10 may comprise a first polarization layer 100, a first substrate 102, a display medium layer 104, a second substrate 106 and a second polarization layer 108. The first polarization layer 100 and the second polarization layer 108 may be arranged correspondingly to each other. The first polarization layer 100 and/or the second polarization layer 108 may be in glossy or matt. The first substrate 102 and/or the second substrate 106 may be disposed between the first polarization layer 100 and the second polarization layer 108. In some embodiments, the first substrate 102 and/or the second substrate 106 may comprise glass substrates, polymer substrates, other appropriate substrates or a combination thereof. In other embodiments, the first substrate 102 may comprise a filter layer or other appropriate film layers. The second substrate 106 may comprise an active device layer, a passive device layer, other appropriate layers, or a combination thereof.

The display medium layer 104 may be disposed between the first substrate 102 and the second substrate 106. The display medium layer 104 may comprise, but is not limited to, a liquid crystal molecule layer, other appropriate display medium layers, or a combination thereof. In one embodiment, the viewing angle control panel 12 may be disposed between the panel 10 and the backlight module 14, and may be used to control switching between the privacy mode and the sharing mode. In other embodiments, the panel 10 may be, but is not limited to, disposed between the viewing angle control panel 12 and the backlight module 14. The viewing angle control panel 12 may comprise a third polarization layer 120, a first compensation film 122, a third substrate 124, a viewing angle control layer 126, a fourth substrate 128, a second compensation film 130 and a fourth polarization layer 132. The viewing angle control panel 12 may be switched between the privacy mode and the sharing mode. The third polarization layer 120 and the fourth polarization layer 132 may be arranged correspondingly to each other. The third substrate 124 and the fourth substrate 128 may be disposed between the third polarization layer 120 and the fourth polarization layer 132. The viewing angle control layer 126 may be disposed between the third substrate 124 and the fourth substrate 128. In some embodiments, the material of the viewing angle control layer 126 may comprise, but is not limited to, liquid crystal molecules or other appropriate materials. For example, an electric field may be applied to the viewing angle control layer 126 to switch the same into the privacy mode or the sharing mode. The first compensation film 122 may be, but is not limited to, disposed between the second substrate 106 and the third substrate 124. The second compensation film 130 may be, but is not limited to, disposed between the fourth polarization layer 132 and the fourth substrate 128. In other embodiments, one of the first compensation film 122 and the second compensation film 130 may be omitted. A sum of retardation in thickness (Rth) of the first compensation film 122 and the second compensation film 130 may, but is not limited to, range between 40 nm and 1200 nm. In some embodiments, rubbing directions of the third substrate 124 and the fourth substrate 128 may be, but is not limited to, substantially parallel or anti-parallel to each other. Phase retardation of the viewing angle control layer 126 may, but is not limited to, range between 400 nm and 1200 nm.

The third polarization layer 120 and the fourth polarization layer 132 may respectively be in glossy or matt. In some embodiments, one of the second polarization layer 108 and the third polarization layer 120 may be omitted to further reduce the size of the display device 1. In some embodiments, the backlight module 14 may comprise a light source 150, an optical adjustment layer 140 and a light guiding plate (LGP) 142. The light source 150 may be disposed in the proximity to the light guiding plate 142. The optical adjustment layer 140 may be disposed on the light guiding plate 142. In some embodiments, the backlight module 14 may further comprise a reflective sheet 144. The light guiding plate 142 may be disposed between the reflective sheet 144 and the optical adjustment layer 140. In another embodiment, the optical adjustment layer 140 may be disposed between the light guiding plate 142 and the reflective sheet 144. The light source 150 may, but is not limited to, comprise an organic light-emitting diode (OLED), a quantum dot (QD), a fluorescent material, a phosphorous material, a light-emitting diode (LED), a micro light-emitting diode or mini light-emitting diode, a quantum dot light-emitting diode (QLED), or a combination thereof. The light guiding plate 142 may comprise a dot-patterned structure, a microstructure or other appropriate structures. The dot-patterned structure may be, but is not limited to, disposed at one side of the light guiding plate 142 close to the reflective sheet 144, and the microstructure may be, but is not limited to, disposed at the other side of the light guiding plate 142 away from the reflective sheet 144. In some embodiments, the light guiding plate 142 may comprise, but is not limited to, a polymer light guiding plate, a glass light guiding plate, and/or air light guiding plate.

Figure 1B:
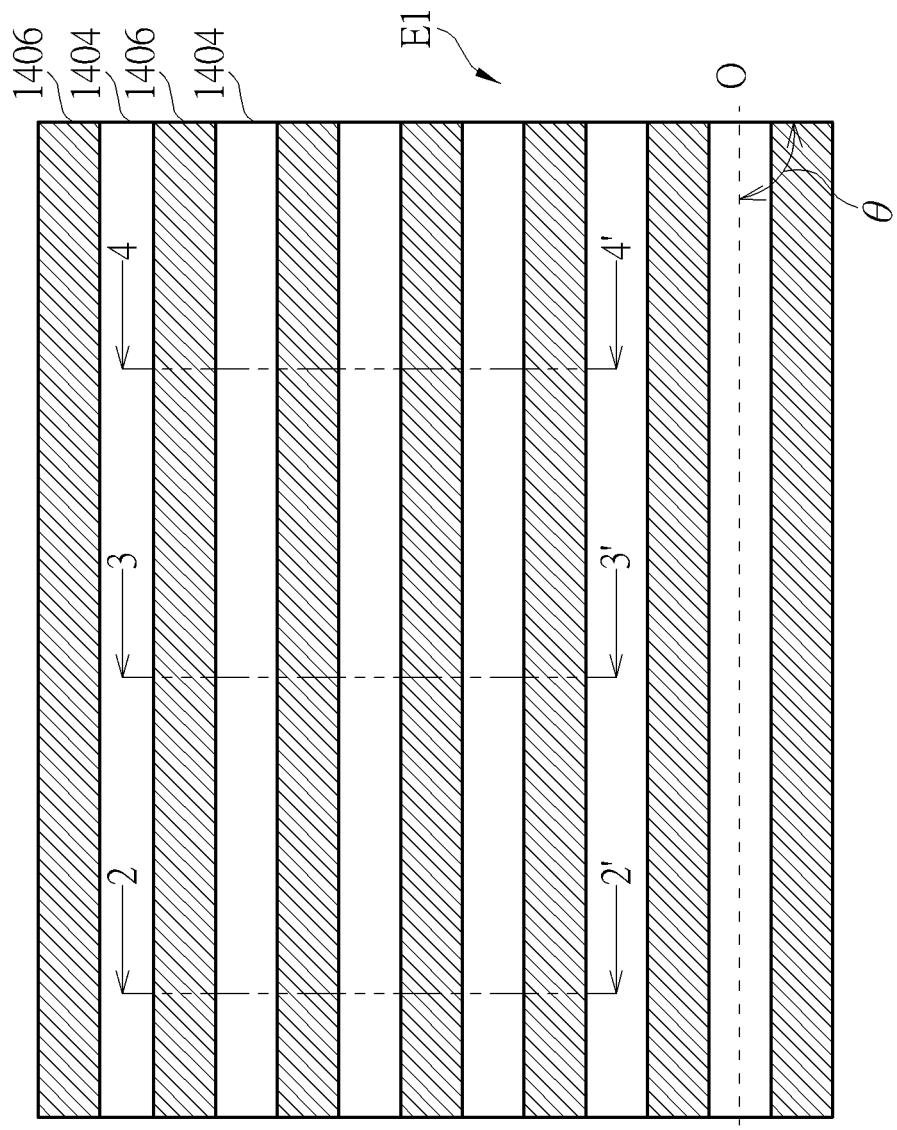
FIG. 1B is a lateral view of the optical adjustment layer in FIG. 1A.

The optical adjustment layer 140 may block a part of the light and pass another part of the light, the optical adjustment layer 140 may increase brightness of a display screen or enhance an anti-prying effect. For example, the optical adjustment layer 140 may adjust a light-emerging angle of the backlight module 14. Referring to FIG. 1B, the optical adjustment layer 140 may comprise a plurality of openings 1404 and blocking parts 1406. The openings 1404 of the optical adjustment layer 140 may substantially extend along a first direction D1 (e.g., an X direction) or a second direction D2 (e.g., a Y direction). The first direction D1 may be, but is not limited to, substantially perpendicular to the second direction D2. When the openings 1404 of the optical adjustment layer 140 substantially extend along the first direction D1, an anti-prying effect may be enhanced at least along the second direction D2. When the openings 1404 of the optical adjustment layer 140 substantially extend along the second direction D2, an anti-prying effect may be enhanced at least along the first direction D1. In other embodiments, the openings 1404 of the optical adjustment layer 140 may, but is not limited to, enhance an anti-prying effect for other viewing angles by extending along a direction different from the first direction D1 and the second direction D2. For example, an angle between an extension direction O of the openings 1404 and an edge E1 of the optical adjustment layer 140 may range between 30° and 150°, and may be, e.g., 60°, 80°, 90°, 100°, 110° or 120°. The optical adjustment layer 140 in the disclosure may filter out a part of the light to enhance an anti-prying effect.

Figure 2:
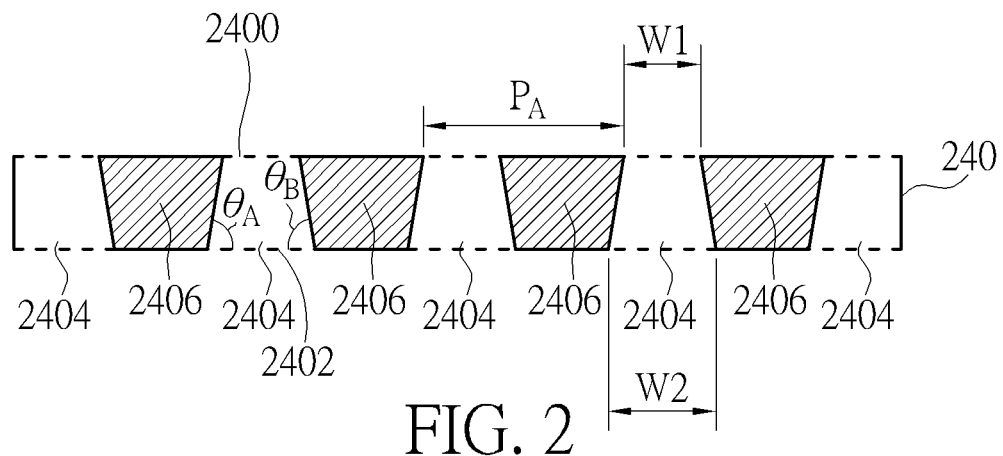
FIG. 2 is a cross-sectional view of an optical adjustment layer in FIG. 1B along line 2-2'.
Figure 3:
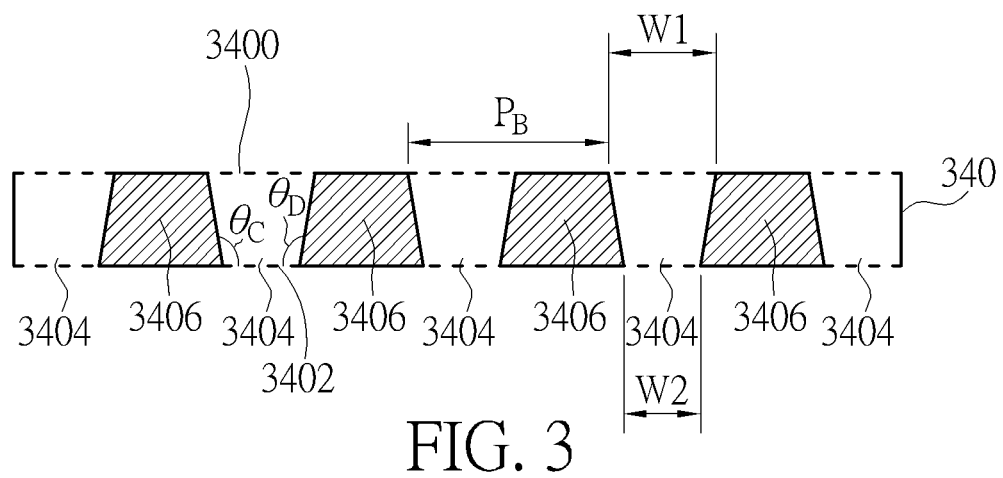
FIG. 3 is a cross-sectional view of an optical adjustment layer in FIG. 1B along line 3-3'.
Figure 4:
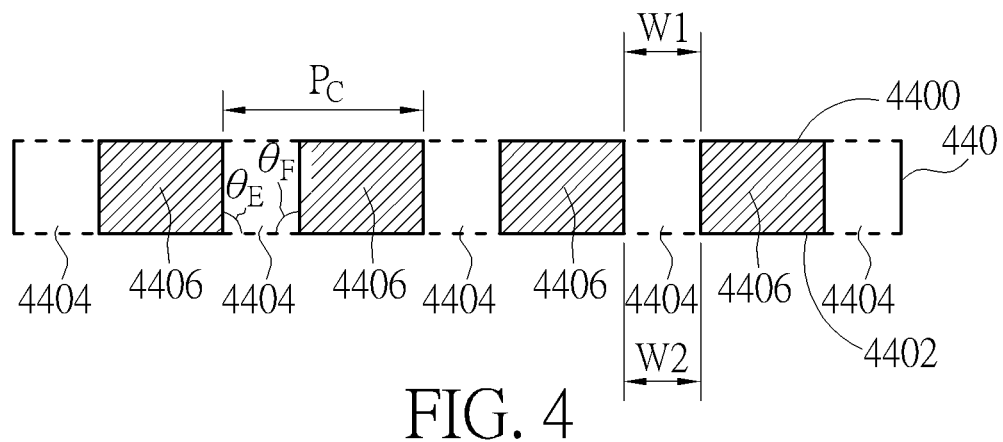
FIG. 4 is a cross-sectional view of an optical adjustment layer in FIG. 1B along line 4-4'.

FIGS. 2, 3 and 4 are cross-sectional views viewed from Lines 2-2', 3-3', 4-4' of the optical adjustment layer in FIG. 1B. Optical adjustment layers 240, 340, 440, or a combination thereof may be, but is not limited to, selected based on the requirements to serve as the optical adjustment layer 140.

FIG. 2 illustrates a cross-sectional view of the optical adjustment layer 240 in FIG. 1B along line 2-2'. The optical adjustment layer 240 may comprise a plurality of openings 2404 and a plurality of blocking parts 2406. The blocking parts 2406 may be, but is not limited to, made of a material including a black matrix material or other appropriate light-blocking materials. The openings 2404 may pass through the optical adjustment layer 240. A first width W1 of the openings 2404 on the first surface 2400 may be different from a second width W2 of the openings 2404 on the second surface 2402. For example, the first width W1 may be less than the second width W2. In the disclosure, the first width W1 and the second width W2 of the openings 2404 may be, but is not limited to, defined as maximum widths measured along a direction substantially perpendicular to an extension direction of the openings 2404. In some embodiments, the blocking parts 2406 on the first surface 2400 and the second surface 2402 may be uneven, making it more difficult to define the first width W1 and the second width W2. In some embodiments, center areas of two blocking parts 2406 adjacent to an opening 2404 and on the first surface 2400 may be connected to form a virtual line, a length of a line segment of the virtual line passing the opening 2404 may be regarded as the first width W1. In a similar manner, center areas of two adjacent blocking parts 2406 and on the second surface 2402 may be connected to form a virtual line to measure the second width W2. The opening widths in various embodiments may be measure using the method, and explanation therefore will be omitted for brevity. In some embodiments, the first width W1 may, but is not limited to, range between 0.005 millimeters (mm) and 0.015 mm, and the second width W2 may, but is not limited to, range between 0.010 mm and 0.020 mm. When the light passing through the optical adjustment layer 240, the blocking parts 2406 may block a part of the light, and the openings 2404 may pass a part of the light. The openings 2404 may have an inclination angle $\theta_A$, and/or an inclination angle $\theta_B$. In some embodiments, the inclination angle $\theta_A$ may be substantially identical to or different from the inclination angle $\theta_B$. The inclination angle $\theta_A$ may range between 30° and 89°, and may be, e.g., 40°, 50°, 60°, 70° or 80°. The inclination angle $\theta_B$ may range between 30° and 89°, and may be, e.g., 40°, 50°, 60°, 70° or 80°, and is not limited thereto. The field of view of the light passing through the optical adjustment layer 240 may substantially range between a normal of the optical adjustment layer 240 plus an inclination angle $\theta_A$ and minus the inclination angle $\theta_A$, and/or the normal of the optical adjustment layer 240 plus an inclination angle $\theta_B$ and minus the inclination angle $\theta_B$. The spacing $P_A$ between openings 2404 may range between 0.04 mm and 0.08 mm, e.g., 0.05 mm, 0.06 mm or 0.07 mm. In the disclosure, the spacing $P_A$ may be measured by measuring a distance from the center of an opening 2404 to the center of an adjacent opening 2404 from a top view direction. Alternatively, the spacing $P_A$ may be, but is not limited to, measured by measuring a distance from one edge of the opening 2404 on the first surface 2400 to a corresponding edge of an adjacent opening 2404 on the first surface 2400 from the top view direction. The opening spacing in various embodiments may be measured using the method, and explanation therefor will be omitted for brevity.

FIG. 3 illustrates a cross-sectional view of the optical adjustment layer 340 in FIG. 1B along line 3-3'. The optical adjustment layer 340 may be substantially similar to the optical adjustment layer 240. The optical adjustment layer 340 may comprise a plurality of openings 3404 and a plurality of blocking parts 3406. A first width W1 of the openings 3404 on the first surface 3400 may exceed a second width W2 of the openings 3404 on the second surface 3402. The openings 3404 may have an inclination angle $\theta_C$, and/or an inclination angle $\theta_D$. In some embodiments, the inclination angle $\theta_C$ may be substantially identical to or different from the inclination angle $\theta_D$. The inclination angle $\theta_C$ may range between 91° and 150°, and may be, e.g., 95°, 105°, 115°, 125° or 135°. The inclination angle $\theta_D$ may range between 91° and 150°, and may be, e.g., 95°, 105°, 115°, 125° or 135°, and is not limited thereto. The spacing $P_B$ between openings 3404 may range between 0.04 mm and 0.08 mm, and may be, e.g., 0.05 mm, 0.06 mm or 0.07 mm. In some embodiments, the first width W1 may, but is not limited to, range between 0.005 mm and 0.015 mm, and the second width W2 may, but is not limited to, range between 0.010 mm and 0.020 mm.

FIG. 4 illustrates a cross-sectional view of the optical adjustment layer 440 in FIG. 1B along line 4-4'. The optical adjustment layer 440 may be substantially similar to the optical adjustment layer 240. The optical adjustment layer 440 may comprise a plurality of openings 4404 and a plurality of blocking parts 4406. A first width W1 of the openings 4404 on the first surface 4400 may be substantially identical to the second width W2 of the openings 4404 on the second surface 4402. The openings 4404 may comprise an inclination angle $\theta_E$, and an inclination angle $\theta_F$. In some embodiments, the inclination angle $\theta_E$ may be substantially identical to or different from the inclination angle $\theta_F$. The inclination angle $\theta_E$ may be substantially equal to 90°. The inclination angle $\theta_F$ may be substantially equal to 90°. The spacing $P_C$ between openings 4404 may range between 0.04 mm and 0.08 mm, and may be, e.g., 0.05 mm, 0.06 mm or 0.07 mm.

Figure 1B:
Figure 5:
FIG. 5 is a schematic diagram of a backlight module according to an embodiment of the disclosure.
Figure 6:
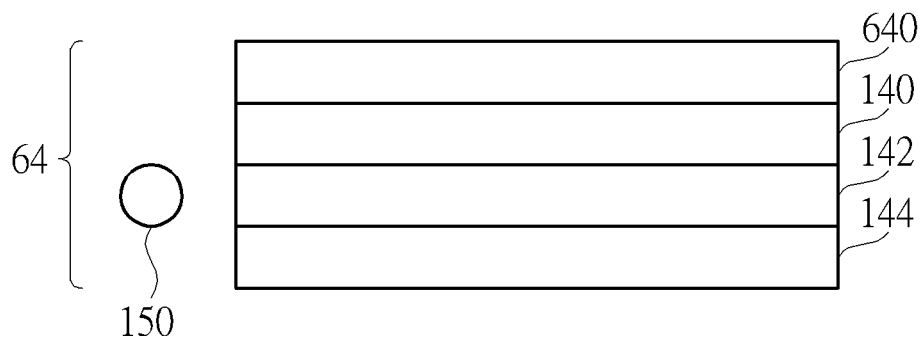
FIG. 6 is a schematic diagram of a backlight module according to an embodiment of the disclosure.

FIG. 5 is a schematic diagram of a backlight module 54 according to another embodiment of the disclosure. The backlight module 54 may be used to replace the backlight module 14 in FIG. 1A. The backlight module 54 may comprise the optical adjustment layer 140, a dual brightness enhancement film (DBEF) 540, the light guiding plate 142, the light source 150 and the reflective sheet 144. The light guiding plate 142 may be disposed between the reflective sheet 144 and the dual brightness enhancement film 540. The dual brightness enhancement film 540 may be disposed between the light guiding plate 142 and the optical adjustment layer 140. The light source 150 may be disposed in the proximity to the light guiding plate 142. The dual brightness enhancement film 540 may produce light converging and brightness enhancement effects. A part of the light may be blocked as the light passing through the optical adjustment layer 140, resulting in a reduction in luminance. Meanwhile, the dual brightness enhancement film 540 disposed below the optical adjustment layer 140 may enhance the luminance of the light in advance, and therefore, the luminance will not be reduced considerably after the light passing through the optical adjustment layer 140. FIG. 6 is a schematic diagram of a backlight module 64 according to another embodiment of the disclosure. The backlight module 64 may be used to replace the backlight module 14 in FIG. 1. The backlight module 64 may comprise a dual brightness enhancement film 640, the optical adjustment layer 140, the light guiding plate 142, the light source 150 and reflective sheet 144. The optical adjustment layer 140 may be disposed between the light guiding plate 142 and the dual brightness enhancement film 640. The light guiding plate 142 may be disposed between the reflective sheet 144 and the optical adjustment layer 140. The light source 150 may be disposed in the proximity to the light guiding plate 142. In some cases, the Moire patterns may be produced as a result of the light passing through the optical adjustment layer 140. Disposing the dual brightness enhancement film 640 on the optical adjustment layer 140 may facilitate light diffusion or smooth the Moire patterns, and increase the field of view, being favorable in the sharing mode. In some embodiments, an upper diffuser film (not shown) may be employed to replace the dual brightness enhancement film 640.

Figure 7:
FIG. 7 is a schematic diagram of a backlight module according to an embodiment of the disclosure.

FIG. 7 is a schematic diagram of a backlight module 74 according to another embodiment of the disclosure. The backlight module 74 may be used to replace the backlight module 14 in FIG. 1A. The backlight module 74 may comprise the optical adjustment layer 140, a compound prism film 740, a lower diffuser film 742, the light guiding plate 142, the light source 150 and the reflective sheet 144. The compound prism film 740, the lower diffuser film 742 and the light guiding plate 142 may be disposed between the optical adjustment layer 140 and reflective sheet 144. The lower diffuser film 742 may be disposed between the compound prism film 740 and the light guiding plate 142. The light source 150 may be disposed in the proximity to the light guiding plate 142. The lower diffuser film 742 may be used to diffuse the light or homogenize the luminance of the light. The lower diffuser film 742 may be optional. In some embodiments, the lower diffuser film 742 may be omitted. The compound prism film 740 may be a crossed brightness enhancement film or a prism-on-prism (POP) film, for use to converge the light. A compound optical film comprises two dual brightness enhancement films stacked on or adhered to each other. In some embodiments, the compound prism film 740 may be disposed directly on the lower diffuser film 742. In other embodiments, the compound prism film 740 may be adhered directly on the lower diffuser film 742 using an optical adhesive, reducing a thickness of the backlight module 74. The optical adhesive may be an optical clear adhesive (OCA), and may reduce optical loss resulting from reflections of interfaces.

Figure 8:
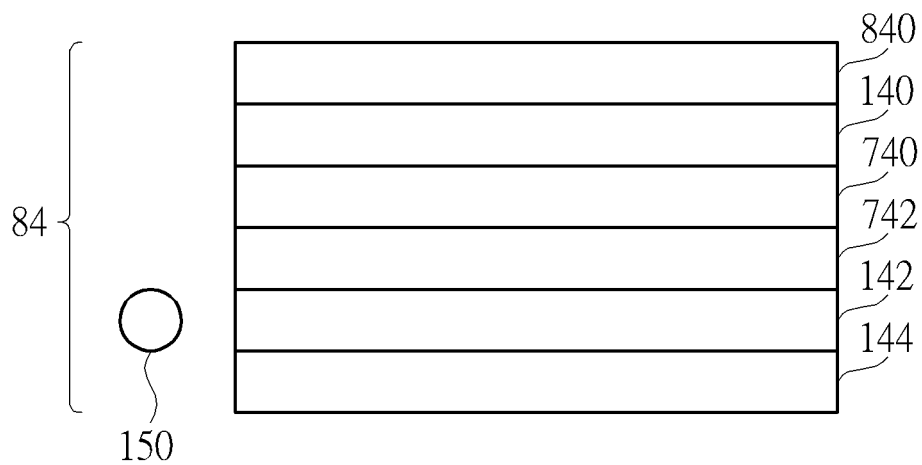
FIG. 8 is a schematic diagram of a backlight module according to an embodiment of the disclosure.

FIG. 8 is a schematic diagram of a backlight module 84 according to another embodiment of the disclosure. The backlight module 84 may be used to replace the backlight module 14 in FIG. 1A. The backlight module 84 may comprise an upper diffuser film 840, the optical adjustment layer 140, the compound prism film 740, the lower diffuser film 742, the light guiding plate 142, the light source 150 and the reflective sheet 144. The upper diffuser film 840, the optical adjustment layer 140, the compound prism film 740, the lower diffuser film 742, the light guiding plate 142 and the reflective sheet 144 may be sequentially disposed on each other from top to bottom. The light source 150 may be disposed in the proximity to the light guiding plate 142. The diffuser film 840 may be used to diffuse the light and smooth the Moire patterns.

Figure 9:
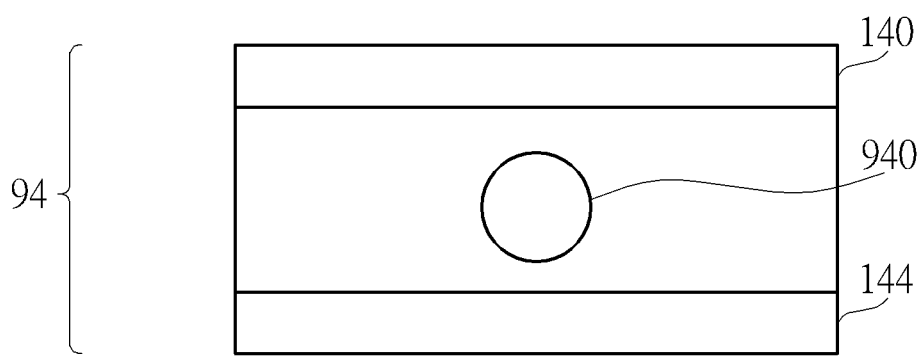
FIG. 9 is a schematic diagram of a backlight module according to an embodiment of the disclosure.

FIG. 9 is a schematic diagram of a backlight module 94 according to another embodiment of the disclosure. The backlight module 94 may be used to replace the backlight module 14 in FIG. 1A. The backlight module 94 may comprise the optical adjustment layer 140, a light source 940 and the reflective sheet 144. In some embodiments, the light source 940 may replace the light source 150 and the light guiding plate 142 in various embodiment of the disclosure.

The backlight module in the disclosure may comprise other appropriate optical films, and will not be explained for simplicity.

Tables 1, 2, 3 illustrate various configurations of the backlight module according to embodiments of the disclosure, including Configurations 1 to 9. The configurations of the backlight module in Tables 1, 2, 3 also show relative locations of various components. For example, in Configuration 1 and Configuration 2, the upper diffuser film is disposed above the dual brightness enhancement film, the dual brightness enhancement film is disposed above the optical adjustment layer, and the optical adjustment layer is disposed above the compound prism film, and so on. Luminance in Configurations 2 to 9 are computed relatively to luminance in Configuration 1. Configurations 1 to 9 serve for exemplary purposes, the disclosure is not limited thereto.

TABLE 1

| Configuration | 1 | 2 |
|---|---|---|
| Upper diffuser film | No | No |
| Dual brightness enhancement film | Yes | Yes |
| Optical adjustment layer | W1 < W2 | W1 > W2 |
| Compound prism film | Yes | Yes |
| Lower diffuser film | Yes | Yes |
| Light guiding plate | Yes | Yes |
| reflective sheet | Yes | Yes |
| Luminance | 100% | 87% |

For Configurations 1 and 2, the dual brightness enhancement film may be disposed above the optical adjustment layer, diffusing the light and reducing the pattern produced by the optical adjustment layer, a part of the light will be lost as passing through the optical adjustment layer, and the luminance will be reduced. Configurations 1 and 2 may reduce the Moire patterns or enhance picture qualities, and provide a larger viewing angle. In some embodiments, Configurations 1 and 2 may have smallest thickness among Configurations 1 to 6.

TABLE 2

| Configuration | 3 | 4 | 5 | 6 |
|---|---|---|---|---|
| Upper diffuser film | Yes or No | Yes or No | No | No |
| Optical adjustment layer | W1 < W2 | W1 > W2 | W1 < W2 | W1 > W2 |
| Dual brightness enhancement film | No | No | Yes | Yes |
| Compound prism film | Yes | Yes | Yes | Yes |
| Lower diffuser film | Yes | Yes | Yes | Yes |
| Light guiding plate | Yes | Yes | Yes | Yes |
| Reflective sheet | Yes | Yes | Yes | Yes |
| Luminance | 112% | 99% | 128% | 115% |

Configurations 3 and 4 may employ no dual brightness enhancement film, and may or may not employ an upper diffuser film. Since no dual brightness enhancement film is employed, a loss owing to the light reflection on the optical adjustment layer may be reduced. Configurations 3 and 4 provide a favorable anti-prying effect. Configurations 3 and 4 may adopt no dual brightness enhancement film and upper diffuser film to reduce a thickness of the backlight module. Employing the upper diffuser film may enhance an effect of the sharing mode or enhance the picture quality.

Configurations 5 and 6 may dispose the dual brightness enhancement film below the optical adjustment layer, and may employ no upper diffuser film. By disposing the dual brightness enhancement film below the optical adjustment layer, the luminance may be enhanced without affecting the anti-prying effect. Configurations 5 and 6 may enhance the luminance by 128% and 115%, respectively. The optical adjustment layer in Configuration 5 may produce collimated light, thereby delivering a favorable anti-prying effect. Configuration 6 can produce favorable effects of the anti-prying mode and the sharing mode. If an upper diffuser film is disposed above the optical adjustment layer, the Moire patterns or the picture quality may be improved.

TABLE 3

| Configuration | 7 | 8 | 9 |
|---|---|---|---|
| Upper diffuser film | Operable with Configurations 1 to 6 | Operable with Configurations 1 to 6 | Adhered privacy film and DBEF (or a diffusion film) |
| Optical adjustment layer | | | |
| Dual brightness enhancement film | | | |
| Compound prism film | PPD structure | Yes | Operable with Configurations 1 to 8 |
| Lower diffuser film | | No | |
| Light guiding plate | Yes | Yes | |
| Reflective sheet | Yes | Yes | |

Configuration 7 employs a prism-prism-diffuser (PPD) structure, utilizing an optical clear adhesive to adhere the compound optical film (two adhered dual brightness enhancement films) and the lower diffuser film, and reducing the thickness of the backlight module. Configuration 7 employs a light guiding plate with an upper surface having a microstructure, and the microstructure may be used to converge the light and enhance luminance. Configuration 7 may be operable with any combination of the upper diffuser film, the dual brightness enhancement film, and the optical adjustment layer. Configuration 8 may employ no lower diffuser film, and may employ the light guiding plate having a microstructure to converge the light. Configuration 9 may employ an optical adjustment layer, a dual brightness enhancement film, and/or an upper diffuser film adhered to each other using the optical clear adhesive. The optical clear adhesive may reduce energy loss owing to the light entering an interface, thereby increasing the luminance.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A display device comprising:
    a viewing angle control panel comprising a viewing angle control layer having phase retardation ranging between 400 nm and 1200 nm;
    a backlight module, arranged below the viewing angle control panel, and comprising:
        a light source;
        an optical adjustment layer, comprising:
            a first surface;
            a second surface, arranged in opposite to the first surface and in proximity to the light source; and
            a plurality of openings, passing through the optical adjustment layer; and
        a dual brightness enhancement film disposed between the optical adjustment layer and the viewing angle control panel;
    wherein a spacing between two adjacent openings of the plurality of openings ranges between 0.04 mm and 0.08 mm; and
    at least one of the plurality of openings has a first width on the first surface, and a second width on the second surface, and the first width is less than the second width.

2. The display device of claim 1, wherein the second width ranges between 0.010 mm and 0.020 mm.

3. The display device of claim 1, wherein an inclination angle between the second surface and an edge of one of the plurality of openings ranges between 30° and 89°.

4. The display device of claim 1, wherein the backlight module further comprises a dual brightness enhancement film disposed between the optical adjustment layer and the light source.

5. The display device of claim 1, wherein at least one of the plurality of openings has a first width on the first surface, and the first width ranges between 0.005 mm and 0.015 mm.

6. The display device of claim 1, wherein the backlight module further comprises a light guiding plate, a reflective sheet and a dual brightness enhancement film, and the light guiding plate is disposed between the reflective sheet and the dual brightness enhancement film.

7. The display device of claim 6, wherein the dual brightness enhancement film is disposed between the light guiding plate and the optical adjustment layer.

8. The display device of claim 6, wherein the optical adjustment layer is disposed between the light guiding plate and the dual brightness enhancement film.

9. The display device of claim 6, wherein the backlight module further comprises a compound prism film disposed between the optical adjustment layer and the light guiding plate.

10. The display device of claim 9, wherein the compound prism film is a crossed brightness enhancement film.

11. The display device of claim 1, wherein the backlight module further comprises an upper diffuser film disposed on the optical adjustment layer.

12. The display device of claim 1, wherein an angle between an extension direction of one of the plurality of openings and an edge of the optical adjustment layer ranges between 30° and 150°.

13. The display device of claim 1, wherein the backlight module further comprises a light guiding plate and a reflective sheet, and the optical adjustment layer, is disposed between the light guiding plate and the reflective sheet.

* * * * *